United States Patent
Blieux et al.

(10) Patent No.: US 8,209,854 B2
(45) Date of Patent: Jul. 3, 2012

(54) METHOD FOR MANUFACTURING A PLASTIC FUEL TANK

(75) Inventors: Alex Blieux, Saint-Felix (FR); Fabrice Laborde, Paris (FR)

(73) Assignee: Inergy Automotive Systems Research (S.A.), Brussels (BE)

( * ) Notice: Subject to any disclaimer, the term of this patent is extended or adjusted under 35 U.S.C. 154(b) by 893 days.

(21) Appl. No.: 12/297,071

(22) PCT Filed: Apr. 19, 2007

(86) PCT No.: PCT/EP2007/053810
§ 371 (c)(1),
(2), (4) Date: Oct. 16, 2008

(87) PCT Pub. No.: WO2007/122168
PCT Pub. Date: Nov. 1, 2007

(65) Prior Publication Data
US 2009/0166367 A1      Jul. 2, 2009

(30) Foreign Application Priority Data

Apr. 21, 2006  (FR) ..................... 06 03573

(51) Int. Cl.
*B23Q 7/10* (2006.01)
*B65D 25/20* (2006.01)
(52) U.S. Cl. .......................... 29/801; 220/694
(58) Field of Classification Search ............... 29/527.1, 29/458, 428, 524.1, 432, 801, 421.1; 220/694; 264/512, 516
See application file for complete search history.

(56) References Cited

U.S. PATENT DOCUMENTS

| 4,952,347 A | 8/1990 | Kasugai |
| 6,860,285 B2 | 3/2005 | Ehrman et al. |
| 2001/0015513 A1 | 8/2001 | Van Schaftingen et al. |
| 2002/0088439 A1 | 7/2002 | Distelhoff et al. |
| 2002/0121300 A1 | 9/2002 | Ehrman et al. |
| 2002/0135347 A1 | 9/2002 | Morgan et al. |
| 2005/0067415 A1 | 3/2005 | Gerard et al. |
| 2005/0205156 A1 | 9/2005 | Ganachaud et al. |
| 2008/0164639 A1 | 7/2008 | Criel et al. |

FOREIGN PATENT DOCUMENTS

| EP | 0281396 A2 | 9/1988 |
| EP | 1595654 A | 6/2001 |
| EP | 1110697 A2 | 4/2002 |
| EP | 1196303 A1 | 4/2002 |
| EP | 1439973 A1 | 7/2004 |
| FR | 2873321 A1 | 1/2006 |
| WO | WO2004024487 A1 | 3/2004 |
| WO | WO2005108144 A2 | 11/2005 |

OTHER PUBLICATIONS

PCT International Search Report dated Jul. 12, 2007 for International Application No. PCT/EP2007/053810 (3 p.). PCT International Preliminary Search on Patentability dated Oct. 22, 2008 including the ISA Written Opinion for International Application No. PCT/EP2007/053810 (7 p.).
Search Report dated Jan. 25, 2007 from Institut National De La Propriete Industrielle for French Application No. FR06.03573 (2 p.).

*Primary Examiner* — John C Hong
(74) *Attorney, Agent, or Firm* — Oblon, Spivak, McClelland, Maier & Neustadt, L.L.P.

(57) ABSTRACT

Method for manufacturing a plastic fuel tank equipped with an internal accessory such as a liquid/vapor separation capacity for a venting system according to which: a parison is molded by blow molding or thermoforming, the accessory is equipped with a metal part and is fastened to the internal wall of the tank at the same time as it is molded, the tank is removed from the mold and the position of the metal part is located, and an opening is made in the wall of the tank depending on the position of the metal part.

9 Claims, 2 Drawing Sheets

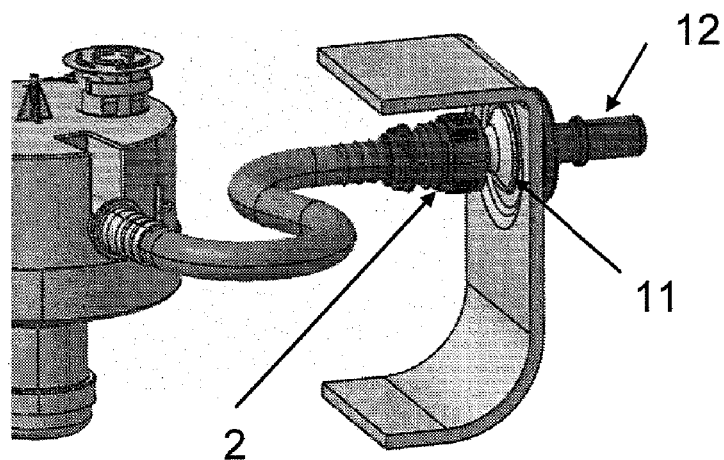
Figure 2
Figure 3
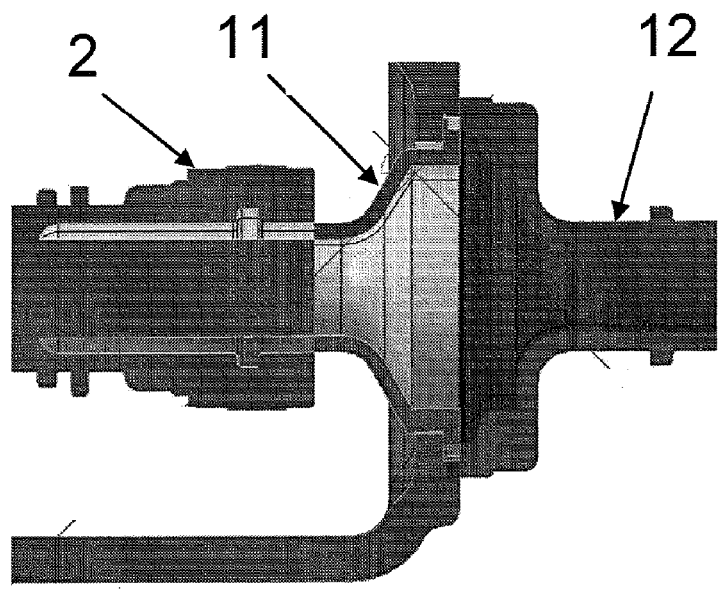

METHOD FOR MANUFACTURING A PLASTIC FUEL TANK

CROSS REFERENCE

This application claims the benefit of priority under 35 U.S.C. §120 for the National Stage of PCT/EP07/53810, filed Apr. 19, 2007, and claims the benefit of priority under 35 U.S.C. §119 from French Application No. 0603573, filed Apr. 21, 2006.

BACKGROUND

According to a first aspect, the present invention relates to a method for manufacturing a plastic fuel tank (FT) equipped with an accessory. According to another aspect, the present invention relates to a particular accessory, namely: a liquid/vapour separation capacity for a FT venting system.

Liquid tanks, when they can be moved with the liquid that they contain, are generally equipped with a venting system that guarantees environmental safety while the tank is subjected to various stresses: movements in any direction and of any amplitude, thermal stresses, underpressure and overpressure.

This requirement is encountered in the case of fuel tanks, in particular when they are mounted on motor vehicles, and it is essential to prevent liquid fuel from getting out and to manage large gas pressure and volume changes when filling the tank and throughout the time that the liquid is stored in said tank.

Solutions have been developed for solving these problems that use safety valves immersed in the tank, the upper portion of the valves passing through a wall of the tank. These valves generally open into a duct that leads to a module or canister containing a material capable of trapping the liquid vapours present in the gases, coming from the tank. However, it is not unusual for systems of this type to still have difficulties owing to the fact that, because of the particular operating circumstances, such as sudden movements or excessive high angle of tilt of the vehicle, liquid coming from the tank can nevertheless pass through the barrier of the safety valve and get into the duct leading to the canister, or even reach the latter and disturb the free flow of the vapours.

To solve this accidental carryover of liquid out of the tank, it has been sought to retain the liquid escaping via the duct leading to the canister by interposing, in this duct, a dead volume intended to act as a capacity for collecting the liquid and for letting the vapours pass freely through.

In conventional fuel systems, the aforementioned accessories (valves, capacity) are fastened to the fuel tank after it has been moulded, and pass through the wall of the tank. However, at the present time, both in Europe and throughout the world, there is a substantial tightening of the requirements regarding the limitation of pollutant emissions into the atmosphere and into the environment in general.

To limit these emissions, care is taken in particular to position the components (ventilation lines, valves, baffles, stiffeners, etc.) inside the tank and/or the fill pipe (see in particular application WO 2004/024487 in the name of the Applicant). However, when these components are fastened to the tank after it has been moulded, it is generally necessary to make at least one opening in the tank so as to be able to introduce said components into the tank and to fasten them thereto.

Therefore, the Applicant has developed a method (the subject of several pending applications) enabling these components to be easily fastened during moulding of the tank. However, the abovementioned accessories (valves, ventilation duct connecting them, liquid/vapour (L/V) separation capacity), which make up what is commonly known as the "venting line", must be connected to the canister as explained previously. However, this canister is generally located outside of the tank and it is therefore necessary to provide a connection passing through the wall of the tank and enabling the venting line to be connected to the canister.

Such a system, with an internal venting line connected to the canister through the wall of the tank is, for example, described in U.S. Pat. No. 6,860,285. However, this document does not give any indication of the practical way for producing this connection. In fact, it is not obvious, on the one hand, how to locate, from the outside, the exact position of the end of the internal venting line to which the duct leading to the canister must be connected, and on the other hand, how to obtain a sealed connection.

SUMMARY

Therefore, according to one aspect, the present invention relates to a method for manufacturing a plastic fuel tank equipped with an internal accessory, according to which:
  a parison is moulded by blow moulding or thermoforming;
  the accessory is equipped with a metal part and is fastened to the internal wall of the tank at the same time as it is moulded;
  the tank is removed from the mould and the position of the metal part is located; and
  an opening is made in the wall of the tank depending on the position of the metal part.

The term "fuel tank" is understood to mean a sealed tank capable of storing fuel under diverse and varied usage and environmental conditions. An example of this tank is that with which motor vehicles are equipped.

The fuel tank according to the invention is made of plastic.

The term "plastic" is understood to mean any material comprising at least one synthetic resin polymer.

All types of plastics may be suitable. Plastics that belong to the category of thermoplastics are particularly suitable.

The term "thermoplastic" is understood to mean any thermoplastic polymer, including thermoplastic elastomers and blends thereof. The term "polymer" is understood to mean both homopolymers and copolymers (especially binary or ternary copolymers). Examples of such copolymers are, non-limitingly, random copolymers, linear block and other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersity of their molecular weight.

In particular, polyolefins, thermoplastic polyesters, polyketones, polyamides and copolymers thereof may be used. A blend of polymers or copolymers may also be used, as well as a blend of polymeric materials with inorganic, organic and/or natural fillers such as, for example, but not limitingly: carbon, salts and other inorganic derivatives, natural or polymeric fibres. It is also possible to use multilayer structures consisting of stacked layers bonded together, comprising at least one of the polymers or copolymers described above.

One polymer often employed is polyethylene. Excellent results have been obtained with high-density polyethylene (HDPE).

The wall of the tank may be composed of a single layer of thermoplastic or of two layers. One or more possible additional layers may advantageously be composed of layers made of a material that is a barrier to liquids and/or gases. Preferably, the nature and the thickness of the barrier layer are chosen so as to minimize the permeability of the liquids and gases in contact with the internal surface of the tank. Preferably, this layer is based on a barrier resin, that is to say a resin that is impermeable to the fuel, such as for example EVOH (a partially hydrolysed ethylene/vinyl acetate copolymer). Alternatively, the tank may be subjected to a surface treatment (fluorination or sulphonation) for the purpose of making it impermeable to the fuel.

The tank according to the invention preferably includes an EVOH-based barrier layer located between the HDPE-based outer layers.

According to the invention, the accessory inside the tank is also at least partly made of plastic. Preferably, it is mainly plastic-based. It may or may not be based on the same plastic as the tank. One plastic that is suitable is POM (or polyoxymethylene, a polyacetyl), as it is a material that is dimensionally stable in fuel oil and alcoholic fuels, although it is expensive. Alternatively, HDPE may be used for its plastic injection moulding ability, its low cost and its compatibility with the fuel. Fastening to the tank walls by rivet punching allows the optional use of other materials.

According to the invention, the tank is produced by moulding a parison. The term "parison" is understood to mean a preform, which is generally extruded and is intended to form the wall of the tank after moulding to the required shapes and dimensions. This preform does not necessarily have to be a one-piece preform.

Thus, advantageously, the parison is in fact formed from two separate pieces, which may be two sheets, for example. However, preferably, these pieces result from the cutting of one and the same extruded tubular parison, as described in application EP 1 111 10 697, the content of which is, for this purpose, introduced by reference into the present application. According to this variant, after extrusion of a single parison, the parison is cut lengthwise along two diametrically opposed lines in order to obtain two separate parts (sheets).

Compared with moulding two sheets that have been extruded separately and whose thickness is constant, this approach makes it possible to use parisons of variable thickness (that is to say that the thickness is not constant along their length), which are obtained by means of a suitable extrusion device (generally an extruder equipped with a die with a pin whose position can be adjusted). Such a parison allows for the thickness reduction which occurs during moulding at certain points of the parison, due to the variable rates of deformation of the material in the mould.

After a parison has been moulded in two pieces, these pieces generally form the lower and upper walls respectively of the fuel tank.

As mentioned previously, the moulding may take place by thermoforming (generally by drawing under vacuum behind the mould) or by blow moulding (by injecting a pressurized fluid into the mould), or even by a combination of the two.

The accessory in question within the scope of the invention is an accessory that is generally part of conventional fuel systems. In particular, as mentioned previously, the internal accessory may consist of at least one part of the venting line of the tank and be intended to be connected to an external accessory, which is preferably a canister. However, it should be noted that the method according to the invention may also be suitable for producing electrical connections or any other type of connection requiring a passage through the wall of the tank to connect two components, internal and external, respectively, to the tank. In this variant, the internal and external accessories are connected through the opening made in the wall of the tank. The term "external" is understood to mean in contact with the surroundings outside of the tank, as opposed to "internal" which means in contact with the internal volume delimited by the tank.

In the variant according to which the internal accessory is at least one part of the venting line, this part may, for example, be a valve, a pipe, a capacity, etc. Preferably, it is an L/V separation capacity as described previously. This capacity is then preferably equipped with a duct that enables it to be connected to a corresponding duct connected to the canister.

In the method according to the invention, the internal accessory is fastened/attached to the parison intended to form the fuel tank after moulding and in particular, onto its internal wall (i.e. the wall facing the internal volume of the tank as opposed to its external wall, facing outside of the tank). This means that it is either directly in contact with the internal wall of the tank, or attached to an intermediate fastening means that is, itself, directly in contact with the tank wall. The term "contact" is understood to mean either a mechanical fastening that can be undone (screws, bolts, etc.), or a permanent fastening such as welding for example. The latter gives good results from the point of view of permeability and is practical to use within the scope of the invention, as the parison is melted/softened during moulding. But in order to be able to apply it, it is necessary that the plastic of the tank and that of the accessory are compatible.

Therefore, other techniques (preferably also taking advantage of the fact that the parison is melted/softened) can also be used such as, for example, rivet punching. This is a technique described in application FR 04.08196 in the name of the Applicant, and the content of which is incorporated by reference in the present application. In this case, the internal accessory is preferably equipped with at least one orifice to make it possible to apply said technique and therefore, to force the molten plastic belonging to the parison through it. This orifice is advantageously produced in the cover of the accessory and/or in an excrescence or fastening tab attached to (or moulded from one piece with) the accessory or its cover. Preferably, the accessory comprises several fastening tabs distributed so as to limit the stresses and vibrations during operation.

The accessory may be fastened to the internal wall of the parison in any known manner, for example using a robot or a core (inner part of the mould). The latter variant is preferred and further details on this subject appear in application FR 05.06574 which is the priority document for international patent application PCT/EP2006/63590 published as WO2007000454A1 on Jan. 4, 2007, in the name of the Applicant, the content of which is incorporated by reference into the present application.

The metal part used in the method according to the invention may be of any shape. However, when the internal accessory is composed or equipped with a pipe (or tube), it is preferably a metal ring encircling said pipe (tube), predominantly at its end.

This part may be based on any metal, preferably one that is resistant to the hydrocarbons that the tank is intended to contain. The metal is preferably magnetic so that it can subsequently be detected by an induction sensor. Stainless steel gives good results.

In the method of the invention, the position of the metal part in the tank is detected using a specific device (detector). It may be an X-ray detector (but of which the optical treatment of the result remains complicated) or an induction detector (chosen for its ease of use and its cost). The latter is preferred.

In the method according to the invention, the opening in the tank wall is generally made just opposite the metal part, and this being done using any suitable tool. This may be the same knife as that being used to cut all the openings in the tank. Preferably, this knife must prevent shavings from dropping into the tank.

Once the opening has been made, according to one preferred variant already mentioned above, the internal accessory is preferably connected to an external accessory. Generally, in order to do this, the two accessories are equipped with a pipe so as to connect the pipes of the two accessories together. In this case, to prevent hydrocarbon emissions into the atmosphere, the connection is preferably located inside the tank and, for practical reasons, very close to the opening in the tank wall.

In a particularly preferred manner, the two pipes have an end with a geometry such that they may be assembled by a quick-connect or snap-fit technique. In general, in this technique, one of the parts (that known as the male part) is fitted into the other part (known as the female part). In particular, when the end of the internal accessory pipe comprises an external metal ring, this part is the female part of the connection and the end of the external accessory pipe is the male part which is clasped therein. In this variant, the metal part also participates in obtaining a good quality connection between the two accessories.

To obtain a sealed connection between the two pipes, generally one of them is equipped with a seal. This seal may be on the outer periphery of the male part or on the inner periphery of the female part. Preferably, the seal is located on the inner periphery of the female part and, in a particularly preferred manner, it is an inwardly-curved flat annular seal. In this manner, the end of the external accessory pipe fits into the seal. For this purpose, the seal is preferably based on a deformable material. It is preferably an elastomer (for example of the NBR (nitrile rubber) or FPM (fluororubber) type) and more particularly a fluoroelastomer (FPM).

According to one practical and economic variant, the aforementioned seal and metal ring are produced from one piece, by overmoulding the metal using the constituent material of the seal. This piece is then, with a suitable geometry, mounted onto the internal accessory pipe before it is fastened to the inside of the tank.

According to a preferred variant of the invention, the external accessory pipe is equipped with a flange based on a plastic that is compatible with that of the tank, and whose size, position and geometry are such that it may be welded onto the perimeter of the opening in the tank, on the external wall of the tank. This approach makes it possible to make the whole assembly impermeable. In general, this welding takes place after the two pipes have been subjected to the snap-fitting described above. Generally, for practical reasons, the flange is located not far from the male part of the quick connection, so that the latter is located very close to the tank wall, just below the flange. A flange made from a single piece with the male part of the snap-fitting mentioned above is easy to produce (by injection moulding for example) and to use. Such a piece is generally described as a tube.

According to another preferred variant of the invention, the two pipes have one end that each forms a female part of a snap-fitting. In general, a flange as described above and comprising two components each having one end forming a male part of a snap-fitting and enabling a quick connection, is welded to the perimeter of the opening in the tank, on the external wall of the tank so that the male end of a component of the flange is oriented towards the inside of the tank and the male end of the other component of the flange is oriented towards the outside of the tank. The two components of the flange are preferably welded before the flange is welded onto the external wall of the tank. In general, this welding of the flange takes place before the two pipes have each been subjected to a snap-fitting with one of the ends of the flange. This variant has the advantage that the flange may be welded onto the tank wall before connecting the external accessory pipe.

Preferably, the flange (the tube, where appropriate) is predominantly impermeable to the hydrocarbons and is, for example, multilayered or surface treated (as described previously). Finally, it should be noted that in order to further reinforce the impermeability, the welding, once it has been carried out, may be covered with a film that is welded, for example by laser radiation. This technique is the subject of patent EP 1 439 973 in the name of the Applicant, the content of which, for this purpose, is incorporated by reference into the present application.

According to another aspect, the present invention also relates to a fuel tank that is mainly plastic-based and that comprises, fastened to its internal wall, an accessory that is also mainly plastic-based, said accessory also being mainly made of plastic and comprising at least one pipe (tube) for connecting it to another accessory, characterized in that the end of this pipe is mounted externally by a metal ring. It goes without saying that this end is free (not fastened to the tank wall) and completely comprised within the internal volume of the tank when the accessory is fastened thereto.

According to what has gone before, the end of the accessory pipe is preferably also equipped with a seal, as explained previously.

In particular, according to this aspect of the invention, the accessory makes up part of the tank ventilating system. The invention gives good results when the accessory is an L/V separation capacity as described previously, mainly plastic-based and comprising at least a dead volume, an inlet pipe for gases loaded with liquid droplets, an outlet pipe for the gases purged of liquid and a device for removing the liquid trapped in the dead volume.

In this type of capacity, the dead volume may have any geometry. Preferably, it has a volume delimited by a predominantly cylindrical module. Preferably, parts (baffles, deflectors, etc.) are placed in this volume so as to collect the droplets contained in the gases to be discharged into the canister. Preferably, the module comprises a cover as described previously, this cover preferably comprises fastening tabs equipped with orifices that enable said module to be fastened to the tank wall by rivet punching. All these parts are preferably made of plastic and are moulded and assembled by any known technique (welding, snap-fitting, etc.).

The device for removing the liquid present in the capacity may also be of any known type. It may be a simple valve (for example, an umbrella-type valve as in the aforementioned patent U.S. Pat. No. 6,860,285) sealing an orifice in the dead volume. Alternatively, it may be a pump creating a vacuum so as to be able to suction the liquid through an orifice in the dead volume. This pump may be a pump specifically provided for this purpose but, preferably, it is the main fuel pump as described in patent EP 1 196 303 in the name of the Applicant, the content of which, for this purpose, is incorporated by reference into the present application. In this variant, it is also advantageous to provide the orifice with a non-return valve so that the liquid cannot flow back through the orifice when the pump is stopped. The action of the fuel pump for generating the vacuum may be direct, or indirect (i.e. said pump may activate a venturi).

According to one particularly preferred variant, the dead volume comprises a secondary chamber where the orifice provided with the non-return valve emerges, and this secondary chamber can be drained by a venturi activated by the engine fuel supply pump.

BRIEF DESCRIPTION OF THE DRAWINGS

The present invention is illustrated, non-limitingly, by FIGS. 1 to 3.

FIGS. 2 and 3 respectively illustrate an overall view of a connection between an L/V separation capacity and an accessory (not shown) outside of a tank and a cross-sectional view of a flange welded onto the external wall of said tank.

DETAILED DESCRIPTION

Figure 1:
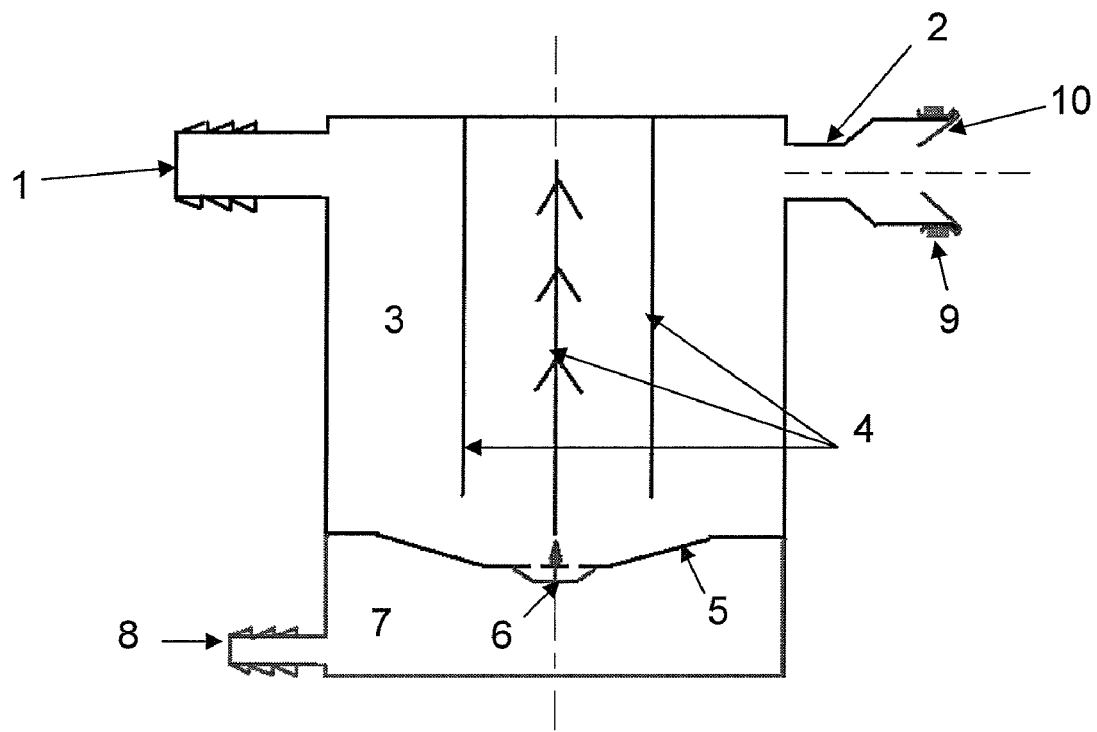
FIG. 1 illustrates a variant of the invention in a (schematic) axial cross section through an L/V separation capacity.

In FIG. 1, the capacity comprises a gas inlet pipe (1) intended to be connected to a venting line, for example via a christmas-tree connection, quick connection or other connection. It also comprises a gas outlet pipe (2) and also a dead volume (3) provided with baffles (4) enabling the liquid to be separated from the vapour. This volume acts as a ventilation zone and it comprises a horizontal wall (5) pierced by an orifice provided with an umbrella valve (6). This orifice leads into a secondary chamber (7) acting as a liquid suction zone. This zone is attached to a tube (8) intended to be connected to a pump (not shown) also by a christmas-tree type connection, quick connection, etc.

The tube (8) allows the liquid contained in the chamber (7) to be evacuated when the pump is in operation. As for the valve (6), it prevents the liquid from flowing back into the ventilation zone (3) through the orifice (5) when the pump is at rest.

The end of the outlet pipe (2) is provided externally with a metal ring (9) and internally with an inwardly-curved annular seal (10). This end forms a female part that is intended to receive a male part of a snap-fitting, attached to a pipe (tube) connected to a canister (not shown) and which will be forced into the seal. In the variant illustrated, the seal overmoulds the metal ring.

This capacity may be fastened to the internal wall of a fuel tank by welding, rivet punching, etc. its upper face to said wall.

In FIG. 2, the capacity is equipped with a pipe having a female type end (2). This end is connected to a male type end (11) of one component of a flange, said flange being welded onto the external wall of the tank. The flange also comprises another male type component (12) oriented towards the outside of the tank.

FIG. 3 illustrates the way in which the two components (11,12) of the flange are assembled (in general, by welding), the flange being welded onto the external wall of the tank.

The invention claimed is:

1. A method for manufacturing a plastic fuel tank equipped with an internal accessory, according to which:
   a parison is molded by blow molding or thermoforming;
   the accessory is equipped with a metal part and is fastened to an internal wall of the tank at the same time as it is molded;
   the tank is removed from a mold and the position of the metal part is located; and
   an opening is made in the internal wall of the tank depending on the position of the metal part.

2. The method according to claim 1, wherein the internal accessory comprises at least one cover and/or one excrescence having an orifice and wherein said internal accessory is fastened to the parison by rivet punching through this orifice.

3. The method according to claim 1, wherein the internal accessory is connected to an external accessory through the opening made in the wall of the tank.

4. The method according to claim 3, wherein the internal accessory is at least one part of a tank venting line and wherein the external accessory is a canister.

5. The method according to claim 4, wherein the part of the venting line is a liquid/vapor separation capacity.

6. The method according to claim 3, wherein the internal accessory is made of or equipped with a pipe, and wherein the metal part is a ring encircling said pipe predominantly at its end.

7. The method according to claim 6, wherein the external accessory is also equipped with a pipe and wherein the internal accessory and external accessory pipes are assembled by a quick connection technique according to which a male part is inserted into a female part.

8. The method according to claim 7, wherein an end of the internal accessory pipe is the female part of the quick connection
   wherein an end of the external accessory pipe is the male part of the quick connection; and
   wherein a seal is located at an end of the female part, over its inner periphery.

9. The method according to claim 7, wherein the external accessory pipe is equipped with a flange based on a plastic that is compatible with that of the tank, and wherein this flange is welded onto the perimeter of the opening in the tank, on the outer side of this tank.

* * * * *